United States Patent
Martin, Jr.

(10) Patent No.: US 11,130,635 B2
(45) Date of Patent: Sep. 28, 2021

(54) EVENT SEATING DELIVERY SYSTEM

(71) Applicant: Lawrence J. Martin, Jr., Gretna, LA (US)

(72) Inventor: Lawrence J. Martin, Jr., Gretna, LA (US)

( * ) Notice: Subject to any disclaimer, the term of this patent is extended or adjusted under 35 U.S.C. 154(b) by 0 days.

(21) Appl. No.: 16/949,338

(22) Filed: Oct. 26, 2020

(65) Prior Publication Data

US 2021/0122574 A1    Apr. 29, 2021

Related U.S. Application Data

(60) Provisional application No. 62/926,042, filed on Oct. 25, 2019.

(51) Int. Cl.
| | |
|---|---|
| *A47F 10/06* | (2006.01) |
| *B65G 15/28* | (2006.01) |
| *B65G 47/57* | (2006.01) |
| *B65G 47/90* | (2006.01) |

(52) U.S. Cl.
CPC ............. *B65G 15/28* (2013.01); *B65G 47/57* (2013.01); *B65G 47/90* (2013.01)

(58) Field of Classification Search
None
See application file for complete search history.

(56) References Cited

U.S. PATENT DOCUMENTS

| | | | |
|---|---|---|---|
| 6,557,669 B2 | 5/2003 | Abekawa | |
| 8,191,704 B2 | 6/2012 | Ishino et al. | |
| 9,237,817 B2 | 1/2016 | Mack | |
| 9,545,160 B2 | 1/2017 | Mack | |
| 9,665,903 B2 * | 5/2017 | Glazer | ............... A47F 10/00 |
| 9,675,192 B2 | 6/2017 | Ishino et al. | |
| 10,349,744 B2 | 7/2019 | Jacobs et al. | |
| 10,405,682 B2 | 9/2019 | Ishino et al. | |
| 10,442,670 B2 * | 10/2019 | Mack | ............... G06Q 10/043 |
| 2005/0015301 A1 | 1/2005 | Johnson | |
| 2005/0279613 A1 | 12/2005 | Ufland et al. | |
| 2006/0011417 A1 | 1/2006 | Chen et al. | |
| 2009/0014279 A1 | 1/2009 | Bouetard | |
| 2009/0281903 A1 | 11/2009 | Blatstein | |
| 2012/0181151 A1 | 7/2012 | Ishino et al. | |
| 2018/0315138 A1 | 11/2018 | Riddiford et al. | |
| 2020/0031592 A1 | 1/2020 | Ogawa et al. | |

* cited by examiner

*Primary Examiner* — Kavel Singh

(57) ABSTRACT

A sub-seating delivery system for event seating venues. The sub-seating system may include a transfer system between a sub-seating conveyor belt and a lower base conveyor belt associated with a plurality of vendors who place orders thereon. The transfer system may incorporate a lift assembly that elevates orders from the base conveyor belt to a relevant sub-seating conveyor belt passing directly under a row of event seating. A delivery robot may be adapted to move an order from the sub-seating conveyor belt to a sub-seating container under a destination seat along the row of event seating. From the sub-seating container, a seated individual may access their ordered items without leaving their seat from which they electronically placed the order.

7 Claims, 3 Drawing Sheets

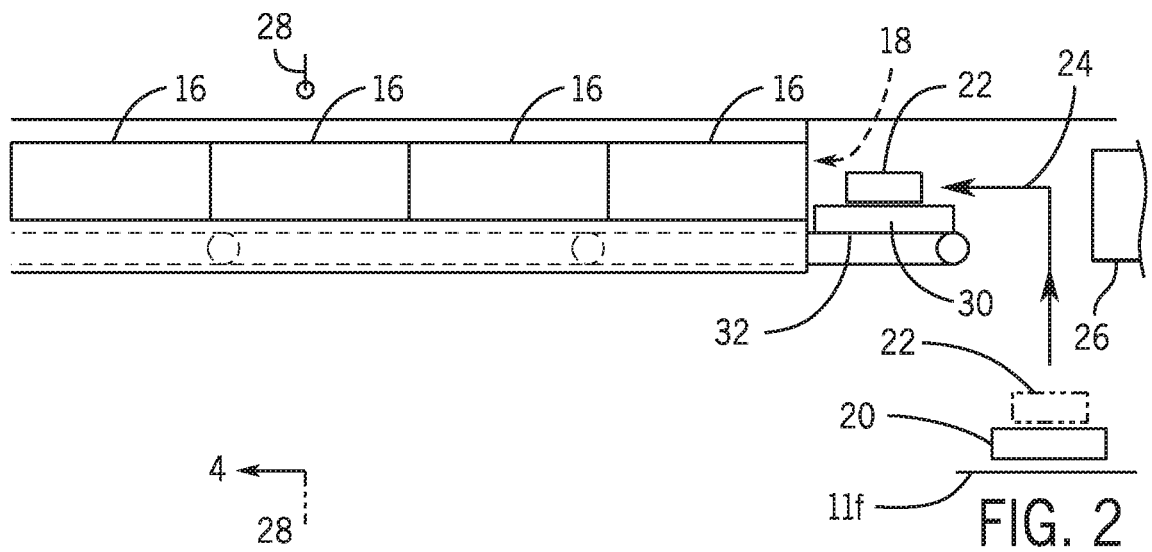
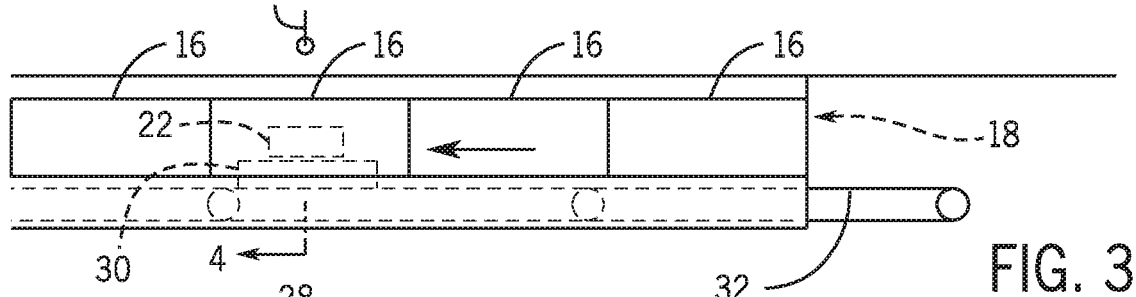
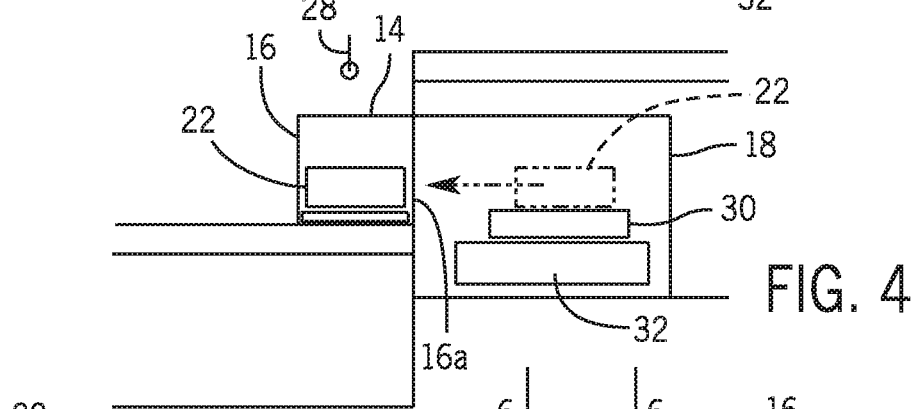
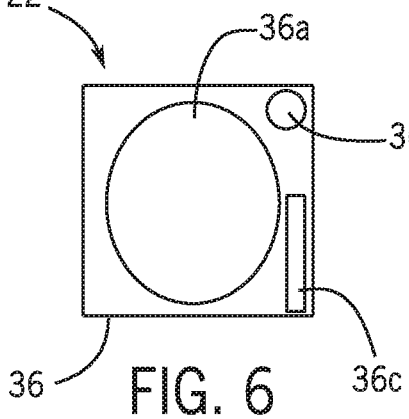
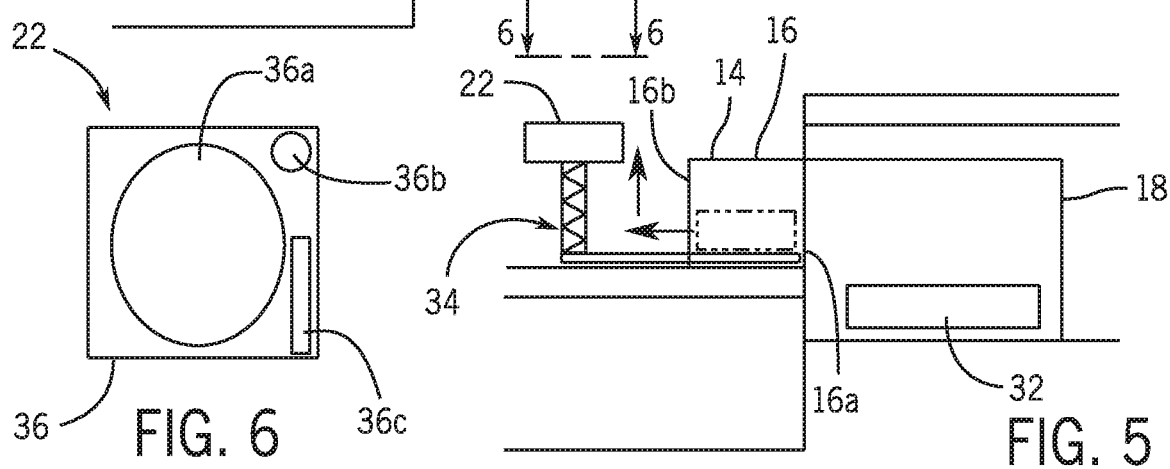

EVENT SEATING DELIVERY SYSTEM

CROSS-REFERENCE TO RELATED APPLICATION

This application claims the benefit of priority of U.S. provisional application No. 62/926,042 filed 25 Oct. 2020, the contents of which are herein incorporated by reference.

BACKGROUND OF THE INVENTION

The present invention relates to delivery systems, and more particularly a sub-seating delivery system for event seating venues. The sub-seating system may include a transfer system between a sub-seating conveyor belt and a lower base conveyor belt associated with a plurality of vendors who place orders thereon. The transfer system may incorporate a lift assembly that elevates orders from the base conveyor belt to a relevant sub-seating conveyor belt passing directly under a row of event seating. A delivery robot may be adapted to move an order from the sub-seating conveyor belt to a sub-seating container under a destination seat along the row of event seating. From the sub-seating container, a seated individual may access their ordered items without leaving their seat from which they electronically placed the order.

Accessing food, beverages, programs, souvenirs, and other venue-related items, while seated in large venues such as banquet halls, arenas, theatres, and stadiums can be an awkward, nerve-racking experience for attendees. Such 'event seating' is typically seats that are sardined together along lengthy rows, with very little leg room between rows, resulting in a narrow passage to walk through when going to find a vendor in another part of the venue, all while navigating other attendees. More harrowing still, is the return trip from the vendor laden with one's purchases (and frequently the purchase made for other's in one's party) while trying to slalom other seated attendees' legs, which seem to occupy all of the narrow passage to one's seat. To say the least, purchases of food and other items at venues with event seating is time-consuming, may lead to unpleasant encounters, and can otherwise lessen enjoyment of the event. And, of course, the attendee could potentially miss a portion of the action (i.e. sporting event, concert, etc.) while on such vendor-seeding missions.

True, a few events have vendors who come to the event seating area, such as a beer and peanut vendor at a baseball game, but such vendors sell limited types of items, and, more importantly, the new normal imposed by COVID-19 strongly suggests that when people do start to return to event seating venues, they will be reluctant to have their food and beverages handed down a long row of other attendees. Another alternative is opting to watch the event in a designated suite, with "private event" style service, but this can be prohibitively expensive.

Additionally, guests' movement to/from their seats inhibits other patron's views of the scene and ultimately disrupts the overall occasion.

As can be seen, there is a need for an improved system of delivering orders to event seating at large venues. Moreover, the delivery of items directly to event seating through a sub-seating container that is supplied by way of sub-seating conveyor belt and operatively associated transfer may be the revolutionary advancement needed for post-pandemic events to thrive.

The present invention may embody a user interface at each seat for ordering the items delivered to the sub-seating container. Accordingly, the patron would never have to leave his or her seat. The service staff performing the preparation and delivery of products are stationed underground or at least under the event seating and would have no direct interaction with the patron. Loading of the delivery orders/trays would be done underneath the seats and delivered automatically to the sub-seating container. In compliance with state and federal laws regarding alcoholic beverage sales, the patron may have to input his or her valid driver's license through the user interface to legally obtain these products.

SUMMARY OF THE INVENTION

In one aspect of the present invention, a delivery system for a venue having an event seating arrangement, the delivery system includes a sub-seating conveyor belt operatively associated with a sub-seating container under each seat of the event seating arrangement.

In another aspect of the present invention, a delivery system for event seating venues, the delivery system includes the following: one or more base conveyor belts at a base elevation, wherein each base conveyor belt is configured to carry a plurality of orders; one or more sub-seating conveyor belts at a sub-seating elevation above the base elevation just below a row of event seating; a transfer system operatively associated between the base conveyor belt and the sub-seating conveyor belt, wherein each transfer system may be a tray balancing mechanism configured to take each order from the base conveyor belt and elevate said order to the sub-seating conveyor belt; and a sub-seating container below each seat of the row of event seating, wherein the sub-seating container communicates with the sub-seating conveyor belt, in certain embodiments by way of sensors.

In yet another aspect of the present invention, the above delivery system includes the following: a plurality of delivery robots spaced apart along each sub-seating conveyor belt, wherein each order is associated with one of the plurality of delivery robots, wherein each delivery robot is configured to transfer the order to the sub-seating container, wherein each order is place on one of the plurality of delivery robots by the transfer system; a delivery tunnel through which each sub-seating conveyor belt operates, wherein each sub-seating container communicates to the delivery tunnel by way of a conveyer side opening; a customer side opening provided by the sub-seating container opposite the conveyer side opening; and a tray lift adjacent the customer side opening for elevating the order.

These and other features, aspects and advantages of the present invention will become better understood with reference to the following drawings, description and claims.

BRIEF DESCRIPTION OF THE DRAWINGS

FIG. 2 is a detailed schematic cross-sectional view, taken along line 2-2 in FIG. 1, illustrating a systemic component of an exemplary embodiment of the present invention;

FIG. 3 is a detailed schematic cross-sectional view illustrating a systemic component of an exemplary embodiment of the present invention;

FIG. 4 is a detailed schematic cross-sectional view, taken along line 4-4 in FIG. 3, illustrating a systemic component of an exemplary embodiment of the present invention;

FIG. 5 is a detailed schematic cross-sectional view illustrating a systemic component of an exemplary embodiment of the present invention;

FIG. 6 is a detailed top plan view of an exemplary embodiment of an order 22 of the present invention, taken along line 6-6 in FIG. 5.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
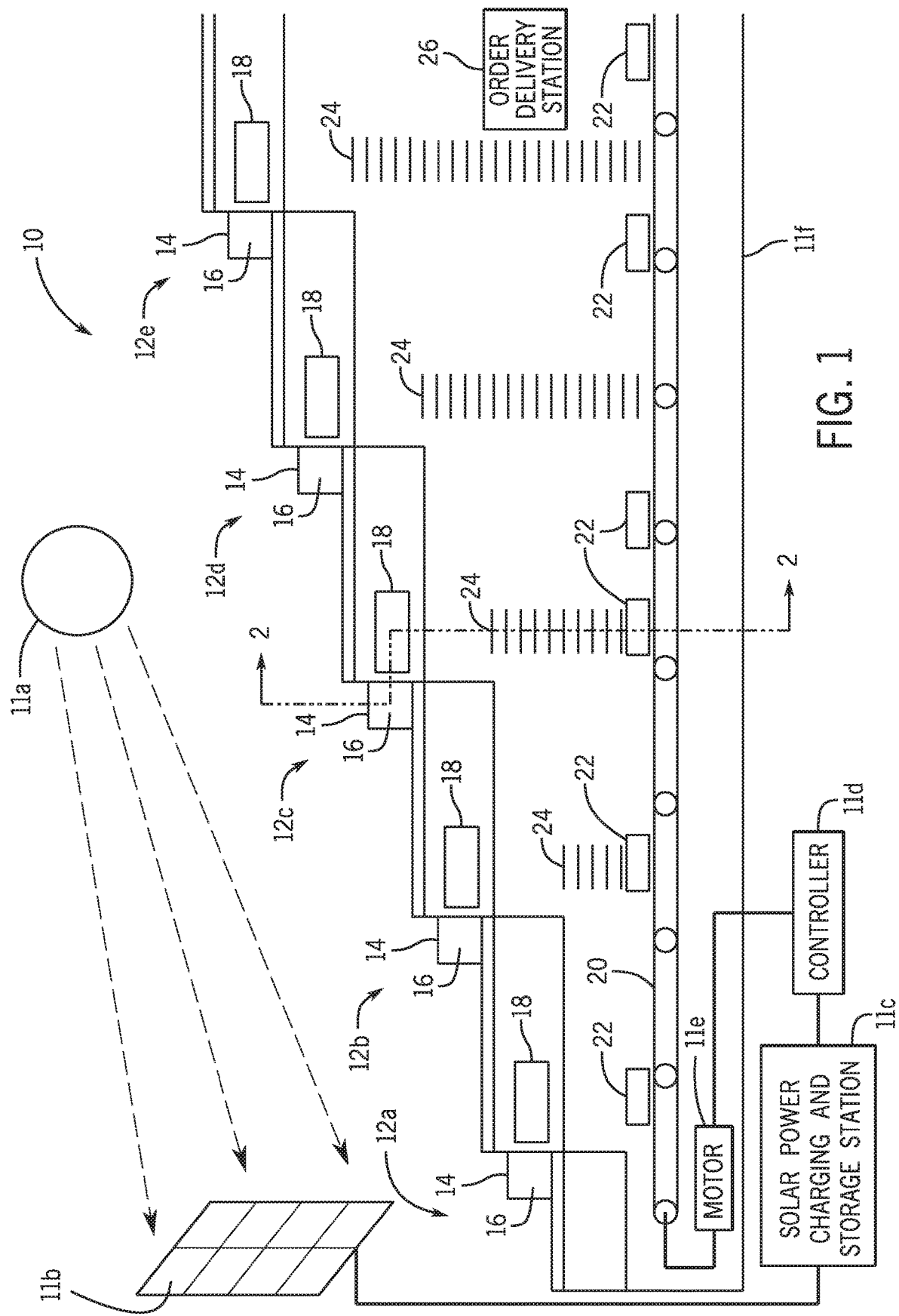
FIG. 1 is a schematic overview of an exemplary embodiment of the present invention.
Figure 7:
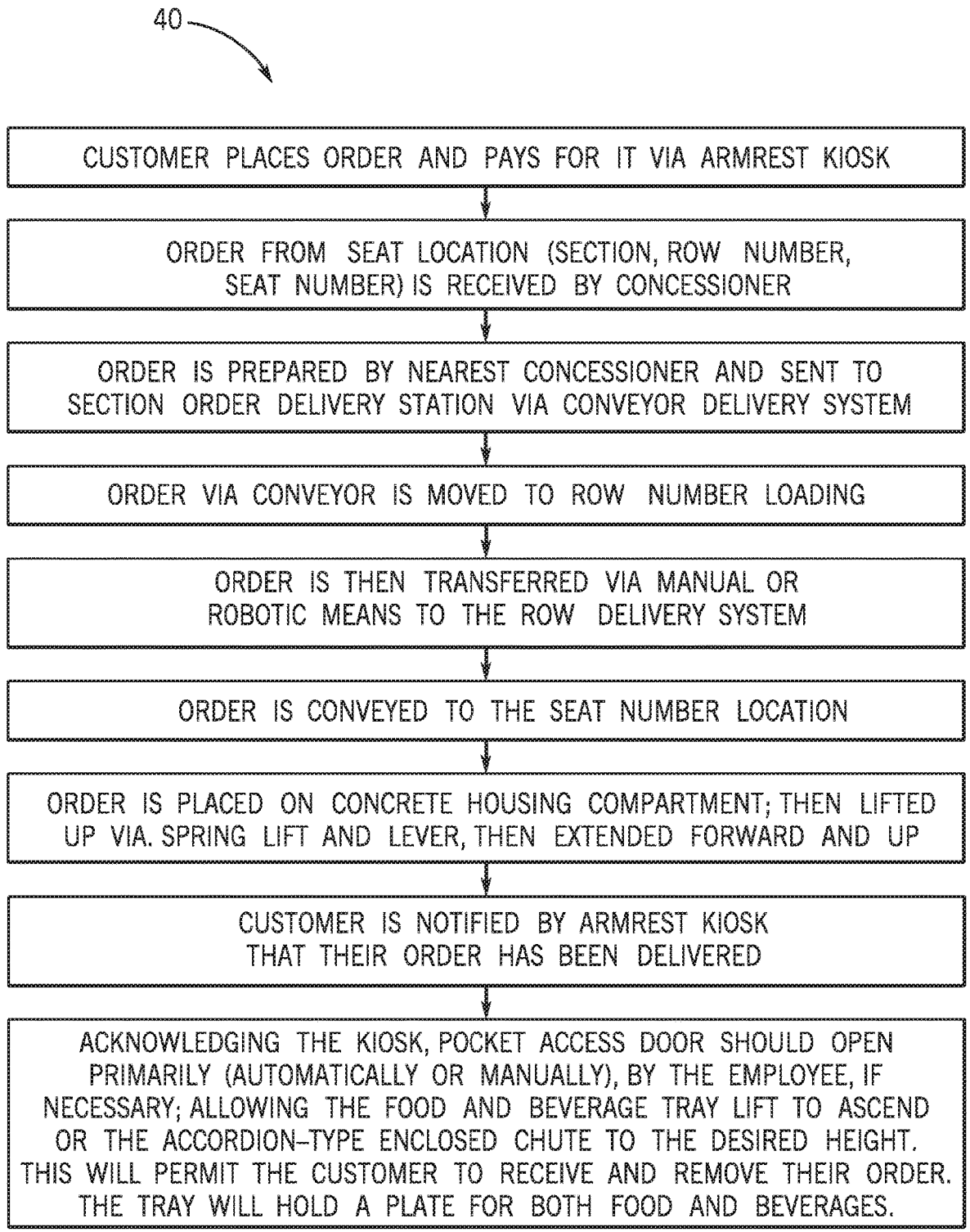
FIG. 7 is a flowchart 40 of an exemplary embodiment of the present invention.

Referring now to FIGS. 1 and 7, the present invention may include a delivery system 10 for event seating venues. The delivery system 10 may be solar powered by the sun 11a by way of solar panels 11b electrically coupled to a solar station 11c, controller 11d and one or more motors or other power sources 11e for powering the conveyor belts 20 and 32 and the transfer system 24.

One or more base conveyor belts 20 may be at a basement level or base elevation 11f, wherein each base conveyor belt 20 is adapted to carry orders 22 along a plurality of rows 12a through 12e of event seating 14, as illustrated in FIG. 1. The one or more base conveyor belts 20 may pass through and/or connect with vendor centers (such as kiosks, full-blown restaurants, etc.) that are licensed out by the venue.

A plurality of row conveyor belts 32 may be at a sub-seating elevation (above the base level) just below the event seating 14 in each respective row 12a through 12e thereof. One of a plurality of transfer systems 24 may be operatively associated between each base conveyor belt 20 and an associated row conveyor belt 32, wherein each transfer system 24 may include mechanical tray lifts or the like enabled to take an order 22 from the base conveyor belt 20 and elevate it to the appropriate row conveyor belt 32. In certain embodiments, a section order delivery station 26 may be employed to facilitate the transfer of the order 22 between belts 20 and 32.

In certain embodiments, the row conveyor belt 32 may be populated with a plurality of spaced apart delivery robots 30. The orders 22, when transferred to the row conveyor belt 32, are placed only on the delivery robots 30, which are adapted to facilitate placing each order 22 at the appropriate order destination 28, as illustrated in FIGS. 3 and 4.

Referring to FIG. 4, each row conveyor belt 32 may travel through a delivery tunnel 18, which also communicates to a sub-seating container 16 under each event seat 14, whereby the relevant order 22 passes through a conveyor side 16a of the sub-seating container 16. Referring to FIG. 5, opposite the conveyor side 16a is a customer side 16b of the sub-seating container 16 through which a user of the event seat 14 can access the order 22.

In certain embodiments, a seat tray lift 34 may be operatively associated with the customer side 16b in such a way that the order 22 may be elevated to facilitate handling of the order 22 by one sitting on the relevant event seat 14. Each tray lift 34 may be a manually elevation-adjustable tray that is selectively adjustable by the user. Referring to FIG. 6, each order 22 may include a tray 36 supporting a serving platter 36a, a beverage holder 36b, and a utensil holder 36c.

According to some embodiments, an audio-visual computerized user interface may be available at each event seat 14 for placing orders 22, making payment, validating identity as well as other information, such a permissible age or license for certain items, as well as receiving notifications that their order 22 is on its way and/or available in the sub-seating container 16. The audio-visual computerized user interface may be located on the armrest of every seat 14. Optionally, the present invention may include peripherals, such as a virtual reality (VR) headset, auxiliary ports for earphones and disposable 3D lenses configured with ordering capabilities available at each seat 14. Also, the peripherals can be used as a standalone entertainment purposes relevant to the event the attendees are viewing.

Additionally, the present invention can be used in all locations and facilities that provide food and beverages including cruise ships, office buildings, hotels, restaurants and airports if the facility provides space underneath the seats so that the orders 22 can be delivered to the seat, by employing delivery robots or alternatively systemic personnel at a mid-floor level below the seating level.

It should be understood, of course, that the foregoing relates to exemplary embodiments of the invention and that modifications may be made without departing from the spirit and scope of the invention as set forth in the following claims.

What is claimed is:

1. A delivery system for event seating venues, the delivery system comprising:
one or more base conveyor belts at a base elevation, wherein each base conveyor belt is configured to carry a plurality of orders;
one or more sub-seating conveyor belts at a sub-seating elevation above the base elevation just below an opening floor of a row of event seating;
a transfer system operatively associated between the base conveyor belt and the sub-seating conveyor belt, wherein each transfer system is configured to take each order from the base conveyor belt by way of tray balancing mechanism, when applicable, and elevate said order to the sub-seating conveyor belt; and
a sub-seating container under the opening floor of each seat of the row of event seating, wherein the sub-seating container communicates with the sub-seating conveyor belt; wherein the sub-seating container having a customer side opening and a tray lift adjacent the customer side opening for elevating the order.

2. The delivery system of claim 1, further comprising:
a plurality of delivery robots spaced apart along each sub-seating conveyor belt, wherein each order is associated with one of the plurality of delivery robots, wherein each delivery robot is configured to transfer the order to the sub-seating container.

3. The delivery system of claim 2, wherein each order is place on one of the plurality of delivery robots by the transfer system.

4. The delivery system of claim 1, further comprising:
a delivery tunnel through which each sub-seating conveyor belt operates, wherein each sub-seating container communicates to the delivery tunnel by way of a conveyer side opening.

5. The delivery system of claim 1, further comprising:
a plurality of delivery robots spaced apart along each sub-seating conveyor belt, wherein each order is associated with one of the plurality of delivery robots, wherein each delivery robot is configured to transfer the order to the sub-seating container.

6. The delivery system of claim 5, wherein each order is placed on one of the plurality of delivery robots by the transfer system.

7. A delivery system for a venue having an event seating arrangement, the delivery system comprising:
 a sub-seating conveyor belt operatively associated with a sub-seating container an opening floor of under each seat of the event seating arrangement; wherein the sub-seating container having a customer side opening and a tray lit adjacent the customer side opening for elevating the order.

\* \* \* \* \*